United States Patent
Song et al.

(10) Patent No.: US 8,623,964 B2
(45) Date of Patent: Jan. 7, 2014

(54) ROOM TEMPERATURE CROSSLINKABLE ION CONDUCTIVE POLYMER SYSTEM

(75) Inventors: Zhiquang Song, Newton, CT (US); Suruliappa G. Jeganathan, Chadds Ford, PA (US); Jacqueline Lau, Dobbs Ferry, NY (US); Rakesh Gupta, Dayton, OH (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/235,881

(22) Filed: Sep. 19, 2011

(65) Prior Publication Data

US 2012/0009481 A1 Jan. 12, 2012

Related U.S. Application Data

(63) Continuation of application No. 12/315,558, filed on Dec. 4, 2008, now abandoned.

(60) Provisional application No. 61/005,649, filed on Dec. 6, 2007.

(51) Int. Cl.
*C08C 19/22* (2006.01)
*C08F 8/30* (2006.01)
*C08F 8/32* (2006.01)

(52) U.S. Cl.
USPC ....... 525/327.4; 252/62.2; 205/414; 205/419; 205/423; 205/431; 205/436; 525/326.7; 525/326.8; 525/328.2; 525/328.4; 525/327.6; 525/327.8; 525/366; 525/374; 525/379; 525/382

(58) Field of Classification Search
USPC ................ 252/62.2; 525/326.7, 326.8, 328.2, 525/328.4, 327.4, 327.6, 327.8, 366, 374, 525/379, 382; 205/414, 419, 423, 431, 436
See application file for complete search history.

(56) References Cited

U.S. PATENT DOCUMENTS

| | | | |
|---|---|---|---|
| 6,267,814 B1 * | 7/2001 | Bury et al. | ................ 106/727 |
| 6,368,746 B1 | 4/2002 | Tahada et al. | |
| 6,537,468 B1 | 3/2003 | Hata et al. | |
| 6,881,820 B1 | 4/2005 | Meador et al. | |
| 2003/0094599 A1 | 5/2003 | Le et al. | |
| 2003/0125471 A1 * | 7/2003 | Ishihara et al. | ............ 525/326.8 |
| 2003/0130397 A1 * | 7/2003 | Wang et al. | ................ 524/430 |
| 2006/0014066 A1 | 1/2006 | Nishimoto et al. | |

FOREIGN PATENT DOCUMENTS

| | | |
|---|---|---|
| EP | 1612232 | 4/2006 |
| JP | 62124103 | 6/1987 |
| JP | 62124128 | 6/1987 |
| JP | 11269239 | 10/1991 |
| JP | 2000-306605 | * 11/2000 |
| JP | 2000306605 | 11/2000 |

OTHER PUBLICATIONS

Ding, Synthetic Metals 87 (1997) 157-163.*
Michel Armand, Solid State Ionics, vol. 9/10, p. 745-754, 1983.
Atsushi Nishimoto, et al. Electrochimica Acta, vol. 43, Nos. 10-11, pp. 1177-1184, 1998.
International Search Report dated Jul. 9, 2009.

* cited by examiner

*Primary Examiner* — Robert C Boyle
(74) *Attorney, Agent, or Firm* — Shiela A. Loggins

(57) ABSTRACT

A room temperature crosslinkable polymer system comprising an anhydride containing polymer and an oxyalkylene amine and a polymer electrolyte derived therefrom are prepared and employed as ion conducting materials for batteries such as lithium ion battery, solar cells and electrochromic devices is disclosed.

15 Claims, No Drawings

ROOM TEMPERATURE CROSSLINKABLE ION CONDUCTIVE POLYMER SYSTEM

This is a continuation application of the U.S. patent application Ser. No. 12/315,558, filed Dec. 4, 2008 now abandoned, which claims the priority date of U.S. Provisional Application No. 61/005,649, filed Dec. 6, 2007

The present invention provides a room temperature crosslinkable polymer system comprising an anhydride containing polymer and an oxyalkylene amine and a polymer electrolyte derived therefrom. The polymer and electrolyte are useful as ion conducting materials for batteries such as lithium ion battery, solar cells and electrochromic devices.

BACKGROUND OF THE INVENTION

Polymer electrolytes have attracted great interest because of their potential in the development of new technologies such as polymer batteries, fuel cells and sensors. For example, the lithium ion battery provides high energy density due to the small atomic weight and the large ionization energy of lithium and has become widely used as a power source for many portable electronics such as cellular phones, laptop computers, mini-cameras, etc. In a battery cell, an electron insulating separator is used to separate the two electrodes and electrolytes are used to facilitate the necessary passage of ions between reduction and oxidation sites. Membranes made from polymeric electrolytes can serve as a combination of separator and electrolyte providing greater efficiency in manufacture of the batteries while addressing growing concerns about their safety by eliminating the flammable organic solvents used in many electrolyte systems.

Armand et al. found in 1978 that poly(ethylene oxide) (PEO) can dissolve lithium perchlorate salts forming a complex that can serve as a solid electrolyte. This complex has a relatively good ionic conductivity in a solid state. However, the ionic conductivity is insufficient as compared with the ionic conductivity of the non aqueous electrolyte solution and the cation transport number of the complex is extremely low.

Subsequently a broad range polymer electrolytes composed of linear polyethylene oxide related polymers such as polypropylene oxide, polyethyleneimine, polyurethane and polyester were developed. In general, these polymer electrolytes have an ionic conductivity at room temperature of about $10^{-7}$ to $10^{-6}$ S/cm. It is believed that ion conduction is due mainly to the amorphous portion of a polyether polymer which conducts ions by local movement of polymer chain segments, Armand, Solid State Ionics, Vol. 9/10, p. 745-754, 1983. A linear polyether polymer such as PEO tends to crystallize with metallic salt dissolved therein and thus limits ion movement so that actual ion conductivity is much lower than the predicted value.

For a polymer electrolyte to offer high ion conductivity, it ideally should have many amorphous regions of good ion conductor mobility and not crystallize even in the presence of a high concentration of dissolved ion-conductive salt. Many attempts to design and make branched PEOs for electrolytes have been reported, for example, Atsushi Nishimoto et al Electrochim Acta, Vol. 43, No. 10-11, pp. 1177-1184, 1998, however, the synthesis is complicated and manufacturing costs are high.

Furthermore, the cation transport number of the PEO complex tends to be extremely low due to a strong interaction of cations with polar groups of the matrix polymer relative to that of anions. In a secondary battery, the electrodes used are active to cations. When an electrolyte with both moveable cations and anions is used, the movement of anions can be interrupted by the cathode resulting in a concentration polarization which may cause fluctuations in voltage or output of the secondary battery. Thus, an ionic conductor having non-moveable anions is desirable. Such material is often referred to as single-ion conductor and generally has a high cation transport number.

U.S. Published Pat. Appl. 2006/0014066A1, incorporated herein in its entirety by reference, discloses an ion conductive polymer having stereospecific structures which are claimed to improve ion conductivity and cationic transport number. The syndiotactic poly(styrene sulfonate) solid polymer electrolyte disclosed therein has a room temperature (25 C) conductivity of $2 \times 10^{-6}$ S/cm, which is higher than conventional solid conductive polymer electrolytes.

U.S. Pat. No. 6,537,468, incorporated herein in its entirety by reference, discloses a polymer electrolyte with high conductivity comprising a polymer containing polyvinyl alcohol units substituted or grafted with oxyakylene and a crosslinker to form a semi-interpenetrating network (IPN) structure wherein a branched oxyalkylene polymer confined in an IPN contributes high ion conductivity and the desired tackiness while the crosslinked structure provides shape retention. The conducting branched polyvinyl alcohol is not covalently linked to the crosslinked network. Solid polymer electrolytes with tackiness were formed by heating (e.g., at 100° C.) to achieve crosslinking.

U.S. Pat. No. 6,881,820, incorporated herein in its entirety by reference, discloses a series of rod-coil block polyimide copolymers formed by condensation polymerization of a tetracarboxylic acid dianhydride with a polyoxyalkylene diamine and an aromatic polyfunctional amine that can be fabricated into mechanically resilient film with acceptable ionic or protonic conductivity at variety temperatures. The copolymers consist of short-rigid polyimide rod segments alternating with polyether coil segments. Preparation of copolymers with graft or comb structures consisting of a rigid polymer backbone with polyether coil graft segments is not disclosed, nor is preparation of crosslinked copolymers using polyfunctional anhydride such as styrene and maleic anhydride copolymer with more than two anhydride functional groups.

U.S. Pat. No. 6,368,746, incorporated herein in its entirety by reference, discloses a molded solid electrolyte consisting of an inorganic solid electrolyte such as lithium sulfide ($Li_2S$) and silicon sulfide ($SiS_2$) with an organic binder polymer such as polybutadiene copolymer rubber.

In spite of these efforts, current polymer electrolytes consisting of branched or grafted oxyalkylene polymers to increase the amorphous portion of the polymer and improve conductivity still fail to provide the ion conductivity desired and typically involve complicated syntheses.

Attempts to develop alternate single ion conductive polymers, for example, with fixed anion groups to raise cation transference number and reduce polarization, have encountered similar drawbacks. High-porous membranes capable of encapsulating a liquid electrolyte in its porous structure were exploited for improved mechanical stability. However, there may be disadvantages of poor contact with electrodes and possibility of liquid leakage. Lithium ion conductive inorganic solid electrolytes were also exploited but require high temperatures to make and are not flexible unless used together with organic polymers.

To achieve high conductivity, gel polymer electrolytes (GPE) using soluble polymers such as poly(ethylene oxide) (PEO), PVC, poly(acrylonitrile) (PAN), poly(methyl methacrylate) (PMMA), poly(vinylidene fluoride) (PVDF)PEO, were developed for use in polymer Li ion batteries. GPE's potentially have ionic conductivity near the order of magnitude of liquid electrolytes ($>10^{-4}$ S/cm possible).

Many of these gel polymer electrolytes typically have either high conductivity with poor mechanical properties or good mechanical properties with low conductivity. PEO-based electrolytes have a high degree of crystallinity unfavorably affecting its ionic conduction. PAN-based electrolytes undergo solvent exudation upon long storage and solvent will ooze to the surface of the polymer membrane decreasing the ionic conductivity dramatically. PMMA-based electrolytes have a high ionic conductivity but it is difficult to form a polymer membrane with stable dimensions and good physical properties.

PVDF with its high dielectric constant ($\in$=0.84) and strong electro-withdrawing functional groups is non-soluble but swellable in carbonate solvents and therefore can provide a supporting structural phase with good mechanical strength when used as the polymer matrix for GPE.

There are many potential advantages in the use of solid polymer electrolytes, for example, adjustable physical properties such as flexibility, rigidity, processability, softness, hardness, porosity, tackiness etc, low toxicity, minimal fire hazard, light weight, high energy density, lower manufacturing costs, improved performance, etc. However, there remains a need for new solid electrolytes having unique molecular architecture and/or new ion transport mechanisms that can provide good ion conductivity at room temperature with no solvent. For example, room temperature conductivity of conventional solid conductive polymer electrolytes is $1 \times 10^{-6}$ s/cm or lower which is insufficient for many applications.

SUMMARY OF THE INVENTION

It has been found that a polymer containing anhydride functional groups (polyanhydride) can react with a mono- and/or poly-oxyalkleneamine at ambient temperature to form a grafted and/or crosslinked oxyalkyleneamide polymer, e.g., an oxyalkylene amic acid containing polymer. The polyanhydride can be a homopolymer or copolymer. Typically each of the anhydride moieties comprised in the backbone are the same, e.g., maleic anhydride, but more than one type of anhydride moiety may be present.

As used herein, "polymer" is a general term which encompasses homopolymers and copolymers. When the phrase "polymer or copolymer" is used, it is used to reinforce the concept that either homopolymers or copolymers may be encountered in the practice of this invention. Typically, however, the polymers are anhydride copolymers.

The graft and/or crosslink reaction can be run at room temperature at low concentration to form the crosslinked or grafted amic acid containing polymer as a gel which is readily converted to a solid membrane by, e.g., solution casting followed by solvent evaporation and completion of the crosslinking or grafting reaction. The graft and/or crosslink reaction can also be carried out in the presence of electrolyte dissolved in organic solvent (organic electrolyte) to form a gel or solid polymer electrolyte with good ion conductivity. For example, the reaction of polyanhydride and polyoxyalkyleneamine proceeds in the presence of a lithium salt at room temperature to form solid polymer electrolyte membranes. Clear rubbery insoluble membranes containing high content of oxyalkylene ether with good ion conductivity are obtained.

The oxyalkyleneamide polymer can also be further treated with heat to transform some or all of the amic amide moieties into imides for improved mechanical properties. The oxyalkylene amic acid groups of the polymer can also be neutralized with a Li base to form a single ion conductive polymer with fixed anionic carboxylate groups and oxyalkylene ether segments for enhanced ion conductivity and improved cation transference number.

The reaction of polyanhydride and mono-oxy or polyoxyalkyleneamine also proceeds at room temperature in presence of lithium base. The added lithium base neutralizes the formed amic acid providing fixed anion groups in the polymer for enhanced cation transportation. Thus a method is provided for preparing a polymer electrolyte containing a high content of amorphous oxyalkylene ether and fixed anion group having the advantages of both branched polyoxyalkylene and single ion conductive polymer.

The grafted or crosslinked polymer readily forms a molded solid membrane and is suitable for use as solid polymer electrolyte in various applications such as batteries, solar cell and electrochromic devices.

DETAILED DESCRIPTION OF THE INVENTION

The present invention provides a grafted or crosslinked ion conducting polymer comprising in the backbone of the polymer one or more moieties selected from

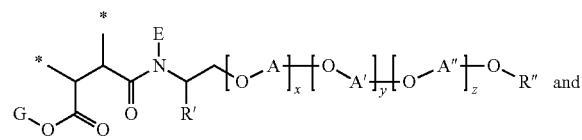

Formula I

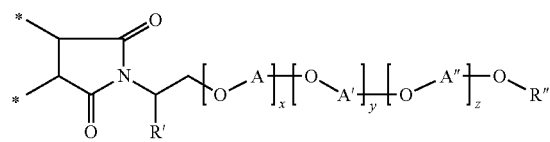

Formula II wherein
* designates connection to the rest of the polymer backbone,
G is H, $C_{1-12}$ alkyl, metal cation or amino cation,
A, A' and A" are independently of the others $C_{1-24}$ alkylene, for example $C_{1-12}$ alkylene,
each of x, y and z is a number from 0 to about 125, preferably from 0 to 50, especially from 0-40, typically at least one of x, y or z is 1 or higher, in particular x is from 1-40 and y and z are independently from 0 to 40,
E is H, $C_{1-12}$ alkyl, or $C_{1-12}$ alkyl carbonyl,
R' is H or $C_{1-12}$ alkyl,
R" is H, $C_{1-12}$ alkyl, $C_{1-12}$ alkyl carbonyl, $C_{6-10}$ aryl, $C_{6-10}$ aryl substituted by 1 or more $C_{1-12}$ alkyl, $C_{7-12}$ aralkyl, $C_{7-12}$ aralkyl substituted by 1 or more $C_{1-12}$ alkyl, or a group

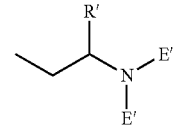

wherein each E' is independently H, $C_{1-12}$ alkyl, or $C_{1-12}$ alkyl carbonyl,
or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more moieties of formula I or Formula II, or the two E' groups together form a maleimide group which is fused to the same polymer backbone or to the backbone of another polymer chain which comprises in the backbone of the polymer chain one or more moieties of formula I or Formula II and thus forming a crosslink.

Alkyl is straight or branched chain of the specified number of carbon atoms, for example, methyl, ethyl, iso-propyl, n-propyl, n-butyl, sec-butyl, tert-butyl, n-hexyl, n-octyl, tert-octyl, 2-ethylhexyl, n-nonyl, n-decyl, n-undecyl, n-dodecyl.

Alkyl carbonyl or alkanoyl is a straight or branched chain of the specified number of carbon atoms which has a carbonyl at the point of attachment.

Alkylene is a chain, which may be linear or branched, of the specified number of carbon atoms substituted at each terminus, for example, methylene, ethylene, propylene, butylene, pentylene, hexylene, octylene, nonylene, decylene, dodecylene, or one of the preceding substituted by one or more $C_{1-12}$ alkyl groups, for example, methylmethylene, dimethylmethylene, ethylmethylene, diethylmethylene, propylmethylene, pentylmethylene, heptylmethylene, nonylmethylene, undecylmethylene, methylethylene, propylethylene, butylethylene, pentylethylene, hexylethylene, decylethylene, 1,1-dimethylethylene, 1,2-dimethylethylene, 1,1-diethylethylene, 1,2-diethylethylene, 1-methyl-1-ethylethylene, 1-methyl-2-propylethylene, methylpropylene, 1,1-dimethylpropylene, 1,2-dimethylpropylene, 1,1-diethylpropylene, 1,2-diethylpropylene and the like.

For example, the alkylene groups represented by A, A' and A" are independently of each other ethylene or alkyl substituted ethylene such as methylethylene. One embodiment of the invention is therefore a grafted or crosslinked ion conducting polymer comprising in the backbone of the polymer one or more moieties selected from

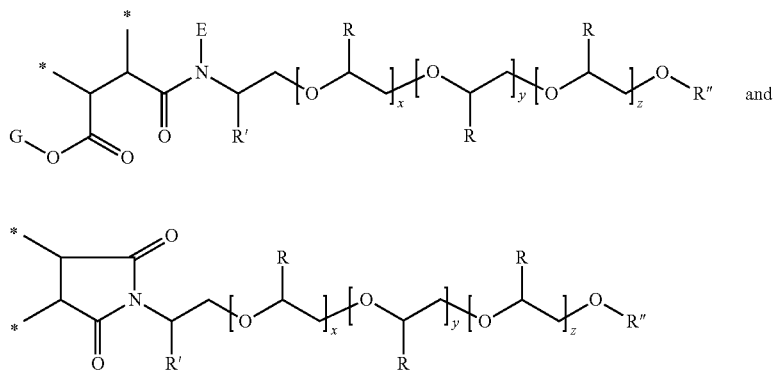

wherein
each R independently of the others is H or $C_{1-12}$ alkyl, for example, each R independently of the others is H or methyl, and the other variables are as described above. For instance, at least one of x, y or z is 1 or higher.

For example, G is H, $C_{1-12}$ alkyl or a metal cation selected from Li, Na, K, Mg and Ca, for example, the metal is Li, E is H; each R independently of the others is H or $C_{1-12}$ alkyl, for example, each R independently of the others is H or methyl; R' is H or methyl and R" is H or a group

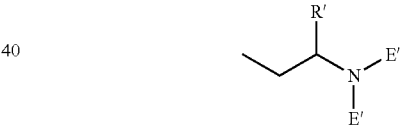

wherein each E' is H or one E' is H and the other is a carbonyl linking group which forms a crosslink as described above, or the two E' groups together form a maleimide group to form a crosslink as described above.

For example, the polymer contains in the backbone moieties selected from

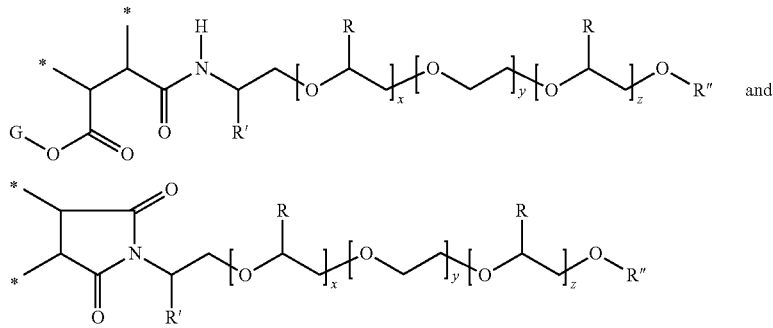

and/or crosslinked moieties selected from

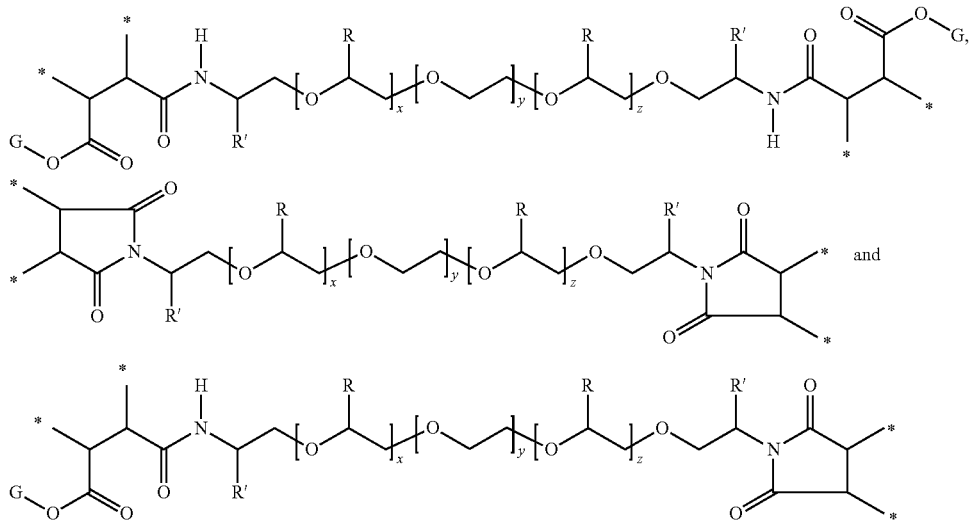

wherein
G is H, $C_{1-12}$ alkyl, metal cation or amino cation, for example, G is H or Li;
each R is independently $C_{1-12}$ alkyl, for example methyl;
R' is H or $C_{1-12}$ alkyl, for example methyl;
R" is H, $C_{1-12}$ alkyl, $C_{1-12}$ alkylcarbonyl, phenyl, phenyl substituted by 1 or more $C_{1-12}$ alkyl, benzyl, phenethyl, benzyl or phenethyl substituted by 1 or more $C_{1-12}$ alkyl, or a group

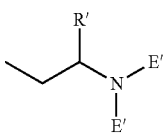

wherein each E' is independently H, $C_{1-12}$ alkyl, or $C_{1-12}$ alkylcarbonyl.

For instance, the grafted or crosslinked ion conducting polymer comprises in the backbone of the polymer one or more moieties selected from R" is H, $C_{1-12}$ alkyl, or $C_{1-12}$ alkylcarbonyl or a group

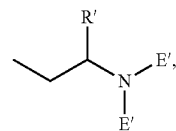

preferably R" is methyl or a group $$\text{(group)}$$

wherein each E' is independently H, $C_{1-12}$ alkyl, or $C_{1-12}$ alkyl carbonyl,

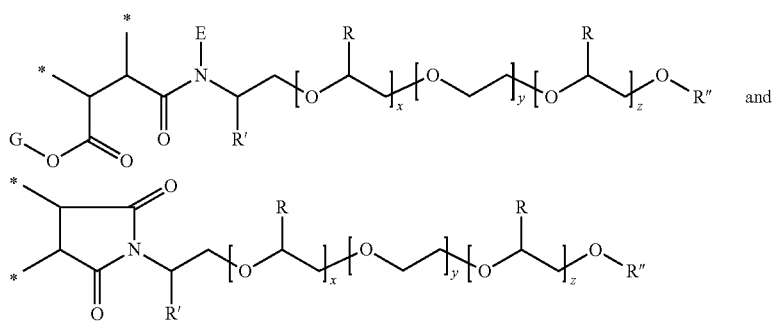

Wherein
* designate the position of attachment the polymer,
G is H, $C_{1-12}$ alkyl or a metal cation, preferably G is H or Li$^+$,
E is H, $C_{1-12}$ alkyl, or $C_{1-12}$ alkylcarbonyl, preferably E is H,
R' and each R independently are H or $C_{1-12}$ alkyl, preferably R' and R are methyl, or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more moieties of Formula I or Formula II, or the two E' groups together form a maleimide group which is fused to the same polymer backbone or to the backbone of another polymer chain which comprises in the backbone of the polymer chain one or more moieties of Formula I or Formula II and thus forming a crosslink, preferably each E' is H, or one E' is H and the other is a carbonyl linking group which forms a crosslink to same polymer backbone or to the backbone of another polymer chain which comprises in the backbone of the polymer chain one or more moieties of Formula I or Formula II, or the two E' groups together form a maleimide group which is fused to the same polymer backbone or to the backbone of another polymer chain which comprises in the backbone of the polymer chain one or more moieties of Formula I or Formula II and thus forming a crosslink.

For instance, the grafted or crosslinked ion conducting polymer comprises in the backbone of the polymer one or more amic acid moieties selected from

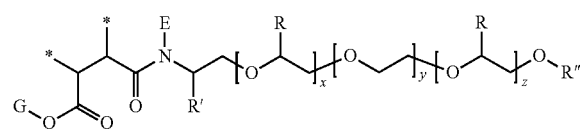

Wherein

* designate the position of attachment the polymer,

G is H, $C_{1-12}$ alkyl or a metal cation, preferably G is H or $Li^+$,

E is H, $C_{1-12}$ alkyl, or $C_{1-12}$ alkylcarbonyl, preferably E is H,

R' and each R independently are H or $C_{1-12}$ alkyl, preferably R' and R are methyl, R" is H, $C_{1-12}$ alkyl, or $C_{1-12}$ alkylcarbonyl or a group

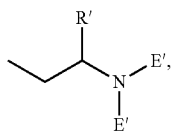

preferably R" is methyl or a group

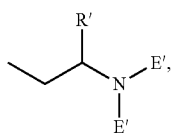

wherein each E' is independently H, $C_{1-12}$ alkyl, or $C_{1-12}$ alkyl carbonyl, or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more amic acid moieties of Formula I, preferably each E' is H, or one E' is H and the other is a carbonyl linking group which forms a crosslink to same polymer backbone or to the backbone of another polymer chain which comprises in the backbone of the polymer chain one or more amic acid moieties of Formula I.

For instance, the grafted or crosslinked ion conducting polymer comprises in the backbone of the polymer one or more maleimide moieties selected from

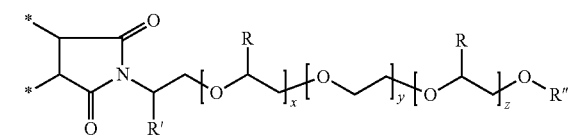

Wherein

* designate the position of attachment the polymer,

R' and each R independently are H or $C_{1-12}$ alkyl, preferably R' and R are methyl, for instance y is from 10 to 40 and x and z are independently from 1 to 10, R" is H, $C_{1-12}$ alkyl, or $C_{1-12}$ alkylcarbonyl or a group

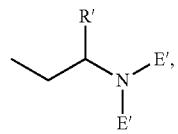

preferably R" is a group

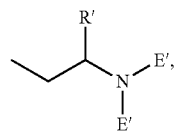

wherein each E' is independently H, $C_{1-12}$ alkyl, or $C_{1-12}$ alkyl carbonyl, or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more maleimide moieties of Formula II, or the two E' groups together form a maleimide group which is fused to the same polymer backbone or to the backbone of another polymer chain which comprises in the backbone of the polymer chain one or more moieties of Formula I or Formula II and thus forming a crosslink, preferably each E' is H, or one E' is H and the other is a carbonyl linking group which forms a crosslink to same polymer backbone or to the backbone of another polymer chain which comprises in the backbone of the polymer chain one or more maleimide moieties of Formula II, or the two E' groups together form a maleimide group which is fused to the same polymer backbone or to the backbone of another polymer chain which comprises in the backbone of the polymer chain one or more moieties of Formula II and thus forming a crosslink.

For example, the polymer contains in the backbone crosslinked amic acid or maleimide acid moieties selected from

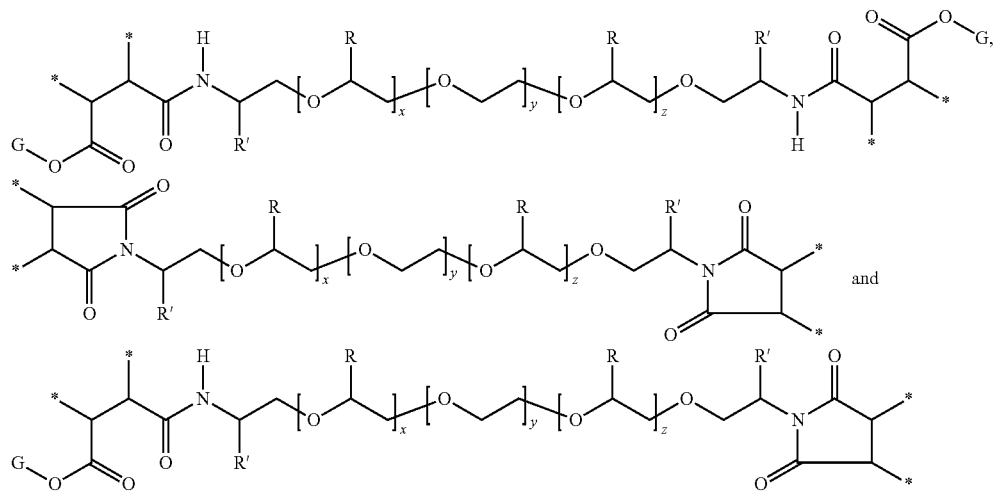

wherein
G is H, $C_{1-12}$ alkyl, metal cation or amino cation, preferably G is H or $Li^+$,
R' and each R independently are H or $C_{1-12}$ alkyl, preferably R' and R are methyl.

For instance, the polymer contains in the backbone crosslinked amic acid moieties selected from

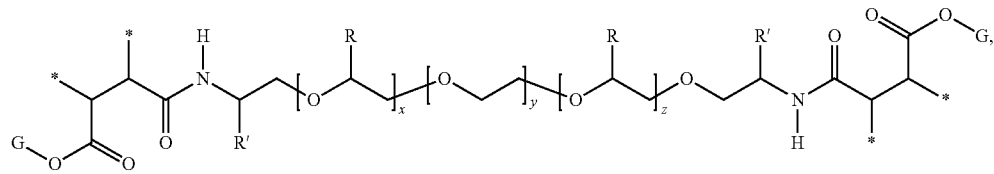

wherein
the definitions are as defined above.

For example, the polymer contains in the backbone crosslinked maleimide acid moieties selected from

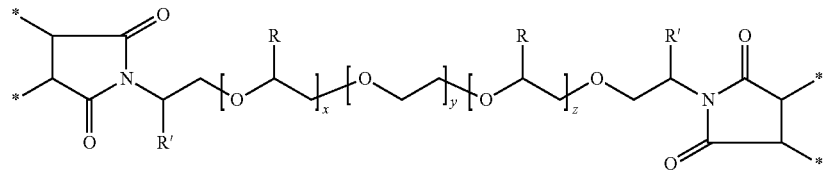

wherein
R' and each R independently are H or $C_{1-12}$ alkyl, preferably R' and R are methyl, for instance y is from 10 to 40 and x and z are independently from 1 to 10.

The polymers of the invention are conveniently prepared by reacting a polymer containing anhydride repeating units in its backbone, for example, a maleic anhydride copolymer, many of which are commercially available, with at least one amine substituted by an alkyleneoxy or polyalkyleneoxy chain or with a diamine wherein the amino groups are linked by an alkyleneoxy or polyalkyleneoxy chain. Typically, polyalkyleneoxy amines or diamines are used. Any number of the anhydride groups of the anhydride containing polymer may be reacted depending on reaction conditions and stoichiometry, for example, 1-99%, for example 10-99%, or 10-95% of the anhydride groups are reacted with amine.

The invention therefore provides a method for the preparation of grafted or crosslinked ion conducting polymers, and the polymers thus obtainable (e.g. prepared), which method comprises reacting a polyanhydride polymer, for example, a maleic anhydride copolymer, with at least one amine of the formula

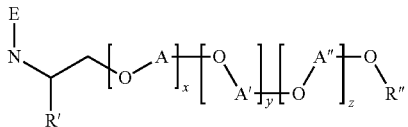

wherein
A, A' and A" are independently of the others $C_{1-24}$ alkylene, for example $C_{1-12}$ alkylene, each of x, y and z is a number from 0 to about 125, typically at least one of x, y or z is 1 or higher, E is H, $C_{1-12}$ alkyl, or $C_{1-12}$ alkyl carbonyl,
R' is H or $C_{1-12}$ alkyl,
R" is H, $C_{1-12}$ alkyl, $C_{1-12}$ alkyl carbonyl, $C_{6-10}$ aryl, $C_{6-10}$ aryl substituted by 1 or more $C_{1-12}$ alkyl, $C_{7-12}$ aralkyl, $C_{7-12}$ aralkyl substituted by 1 or more $C_{1-12}$ alkyl, or a group

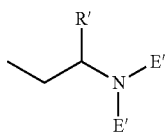

wherein each E' is independently H, $C_{1-12}$ alkyl or $C_{1-12}$ alkylcarbonyl, wherein typically 1-99% of the anhydride units are reacted with amine.

For example, the alkylene groups represented by A, A' and A" are independently of each other ethylene or alkyl substituted ethylene such as methylethylene as in the formula

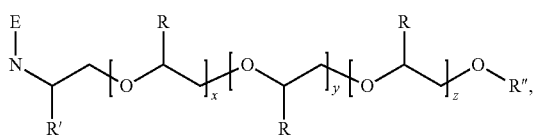

wherein each R independently of the others is H or $C_{1-12}$ alkyl, for example, each R independently of the others is H or methyl, and the other variables are as described above.

For example, an anhydride containing polymer, for example, a maleic anhydride copolymer, is reacted with at least one amine of the formula

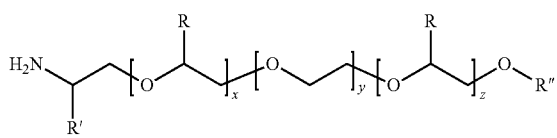

wherein
each R is independently $C_{1-12}$ alkyl, for example methyl,
R' is H or $C_{1-12}$ alkyl, for instance H or methyl, for example methyl,
R" is H, $C_{1-12}$ alkyl, $C_{1-12}$ alkylcarbonyl, phenyl, phenyl substituted by 1 or more $C_{1-12}$ alkyl, benzyl, phenethyl, benzyl or phenethyl substituted by 1 or more $C_{1-12}$ alkyl, or a group

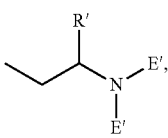

preferably R" is methyl or a group

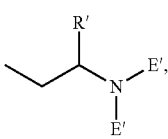

wherein each E' is independently H, $C_{1-12}$ alkyl, or $C_{1-12}$ alkylcarbonyl, preferably H.

Poly-oxyalkylene amine compounds useful in the invention include those prepared by reacting a polyol initiator with propylene oxide and/or ethylene oxide followed by amination of the terminal hydroxyl groups, for example, glycerol tris [poly(propylene glycol), amine terminated]ether and trimethylolpropane (TMP) tris[poly(propylene glycol), amine terminated]ether, and 2,2-bis(hydroxymethyl)-1-butanol tris [poly(propylene glycol), amine terminated]ether.

Suitable oxyalkyleneanmine compounds include commercial products sold by HUNTSMAN under trade name of JEFFAMINES, for example, JEFFAMINE XTJ 502, XTJ505, XTJ 509, and D2000.

Polyanhydride polymers and copolymers useful in the present invention are polymers and copolymers which contain as a repeating unit a cyclic anhydride, such as copolymers comprising maleic anhydride as a monomer unit, for example, maleic anhydride polymers and maleic anhydride copolymers with an ethylenically unsaturated monomer such as styrene, olefins, and (meth)acrylic acid esters and amides, preferably the ethylenically unsaturated monomer is styrene.

Examples of suitable polyanhydrides include poly(styrene-alt-maleic anhydride), poly(styrene-co-maleic anhydride), poly(methyl vinyl ether-alt-maleic anhydride), poly (ethylene-g-maleic anhydride), poly(isobutylene-alt-maleic anhydride), polyisoprene-g-maleic anhydride, poly(maleic anhydride-alt-1-octadecene), poly(ethylene-co-ethyl acrylate-co-maleic anhydride), polyethylene-graft-maleic anhydride, especially poly(styrene-co-maleic anhydride).

For example, the polyanhydride is a copolymer of maleic anhydride and styrene (PSMAn). PSMAn may contain alkyl ester groups corresponding to an ester produced from a reaction of an anhydride group with an alcohol. Preferred partially esterified PSMAn is one containing methyl ester groups with less than 50% of total anhydride groups being esterified.

The incorporation of styrene repeating units into the polyanhydride copolymers facilitates formation of amorphous regions of the polyether segments in the grafted or crosslinked polymer, especially in the presence of high concentration of ion conductive salt.

For example, the grafted or crosslinked ion conducting polymer of the invention is a poly(styrene-co-PEO maleicamic acid) obtained by reacting PSMAn with an oxyalkyleneamine, preferably a polyfunctional oxyalkyleneamine, such as polyoxyethylene (PEO) diamine. The lithium salt of the poly(styrene-co-PEO maleicamic acid) is readily obtained by neutralization with a lithium base such as lithium hydroxide or lithium methoxide, and conversion to poly(styrene-co-PEO maleic imide) can be effected by heating in vacuum. Of course the actual "styrene-co-PEO maleicamic acid" polymer ultimately obtained by any of these processes, or any combination of these processes may contain a certain amount of amic acid moieties, acid salts and/or imides based on partial conversion to salt or imide.

Solid polymer electrolyte membranes can be prepared by performing the grafting or crosslinking reaction in the presence of a lithium salt. Gel polymer electrolyte membranes are also prepared by post soaking the preformed poly(styrene-co-PEO maleic) polymers with a liquid electrolyte.

To further illustrate certain aspects of the invention, the reaction of the maleic anhydride copolymers, PSMAn, with amino polyalkyleneoxides, for example, JEFFAMINES, is demonstrated below where R, R', R" and R"' are independently a C1 to C12 alkyl group. Of course, the isomer of the first product is also possible.

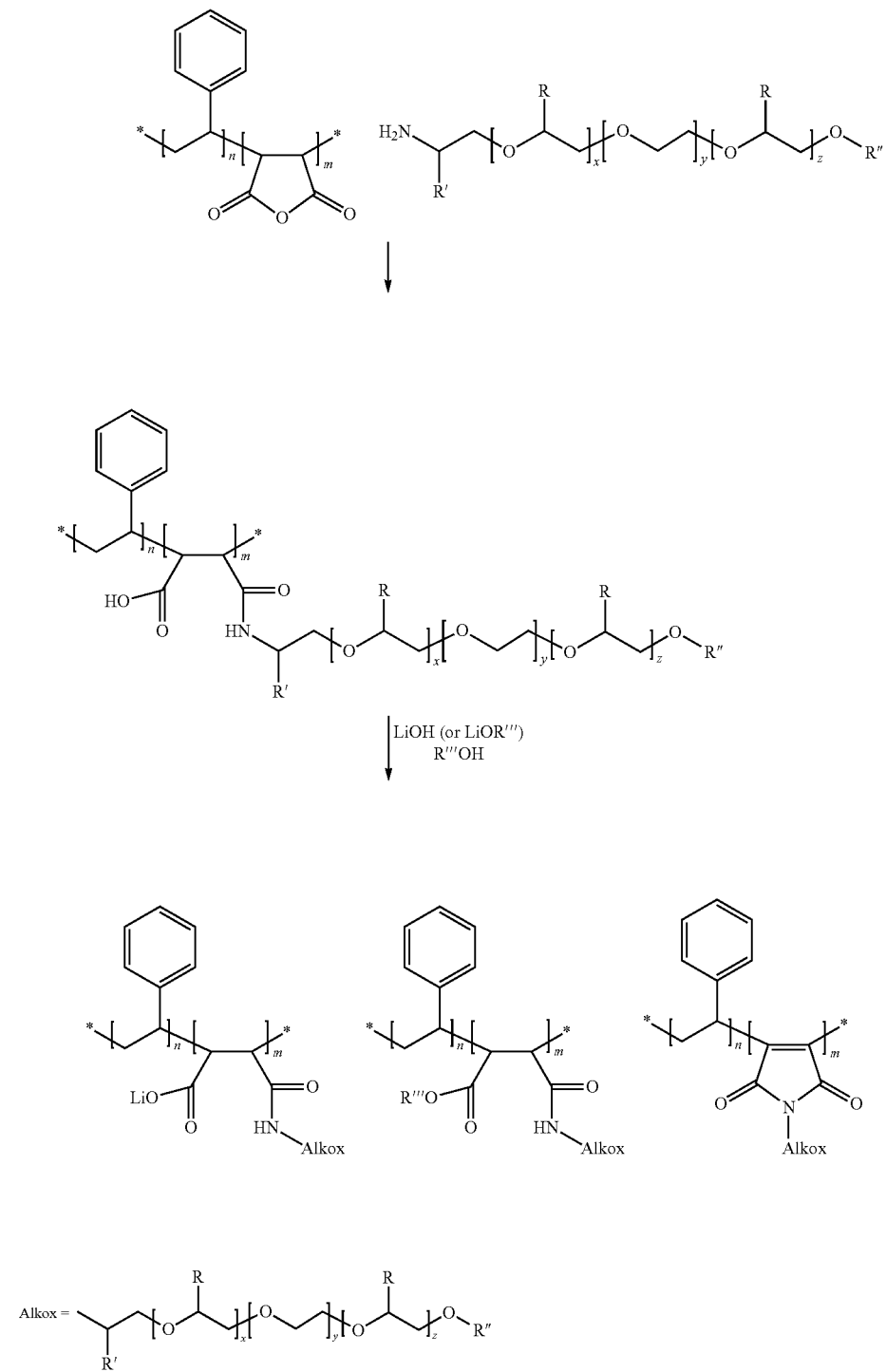

Reaction products of PSMAn with mono-functional oxyalkyleneamine are generally soluble. Solid polymer electrolyte membranes can be prepared by dissolving the oxyalkyleneamide or oxyalkyleneimide product in a suitable solvent and/or a liquid electrolyte solution and casting the polymer solution on substrate.

Crosslinked polymers are similarly prepared by reacting PSMAn with an oxyalkylene diamine, or an oxyalkylene poly-amine with more than one amine group per molecule. In such cases, insoluble membranes can be formed by carrying out the reaction in a suitable solvent and casting the reacting solution on a substrate or in a container.

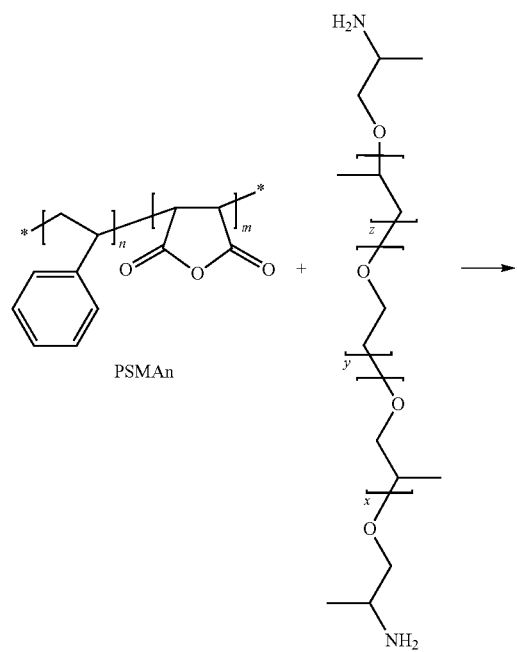
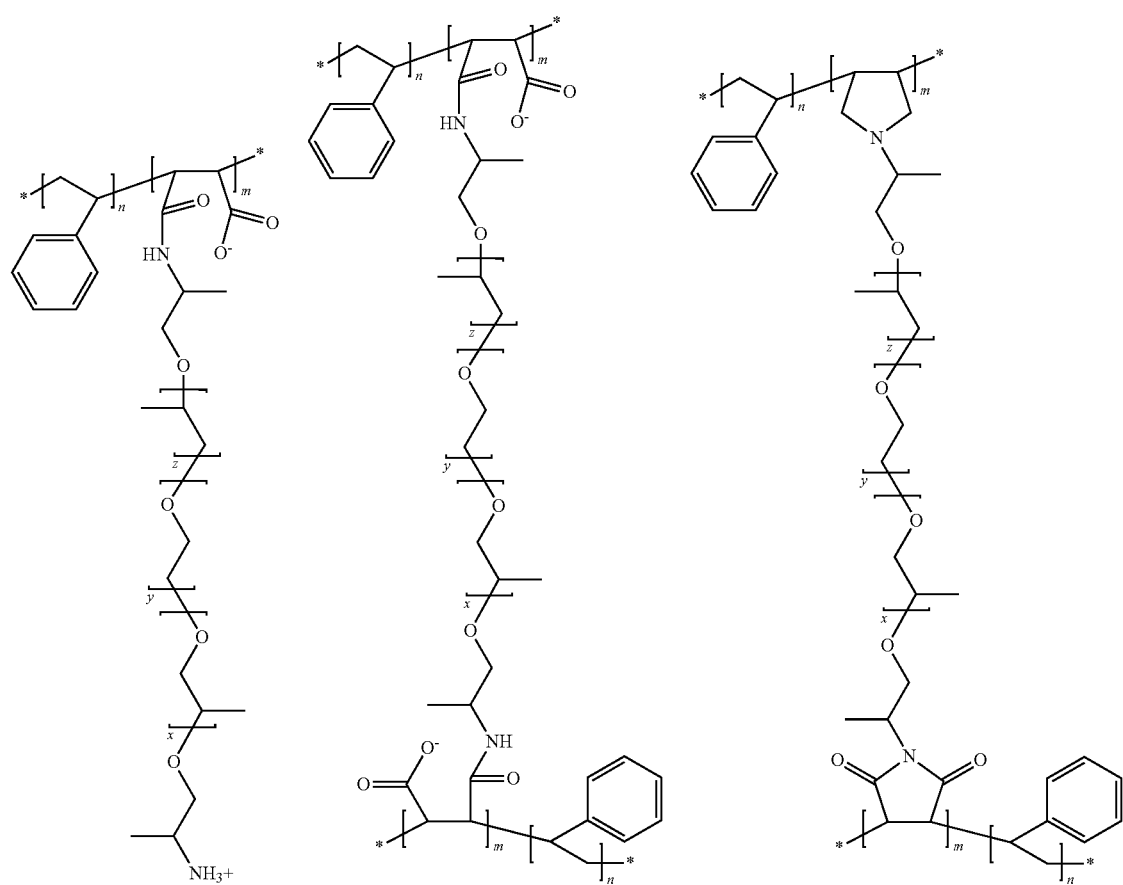

And further:
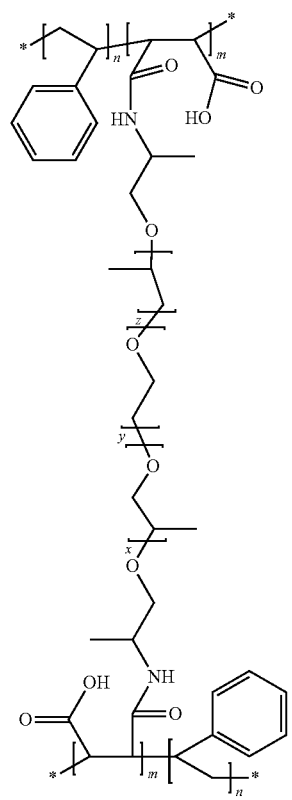
LiOH or LiOCH₃ / ROH →
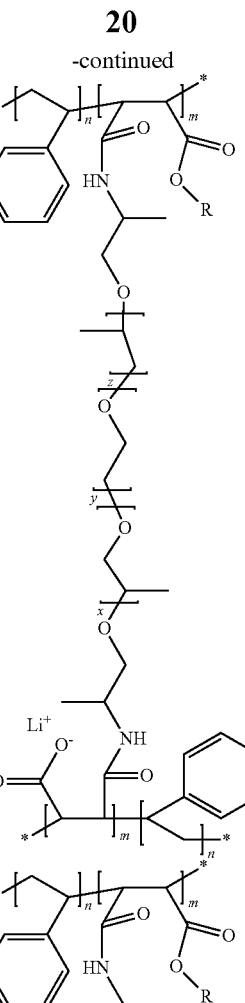
-continued
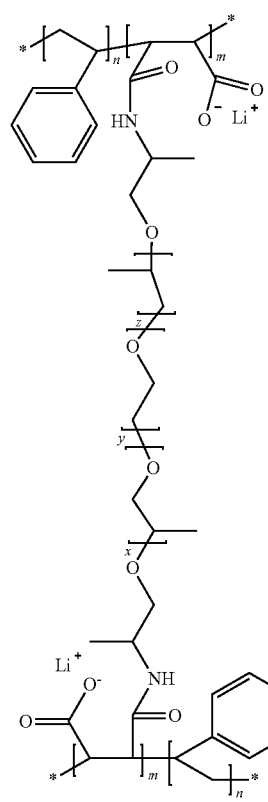
Solid polymer electrolyte membranes or films can be obtained by allowing complete evaporation of solvent at ambient temperature and/or at elevated temperature. Gel polymer electrolyte membranes can be obtained without drying or by partial drying to allow partial solvent evaporation.

Solvent or plasticizer content of a gel polymer electrolyte can be easily controlled by preparing the initial reaction solution with desired amount of solvent or by allowing partial evaporation solvent. Solvent mixtures containing volatile and non-volatile solvent (or plasticizer) can be used to prepare gel polymer electrolytes containing desirable amount of solvent or plasticizer content to balance mechanical properties and ion conductivity.

The present invention therefore provides a simple synthesis and easy process for the preparation of membranes with good conductivity and mechanical properties. Clear rubbery insoluble membranes with high oxyalkylene ether content are obtained which are potentially inexpensive to manufacture. The method is versatile and membranes with different mechanical and electrical properties can be made by changing the composition and proportion of the amine/polyanhydride crosslink system.

The presently provided polymer electrolytes contain a high content of amorphous oxyalkylene ether and fixed anion group and possess the advantages of both branched polyoxyalkylene and single ion conductive polymers. The present solid polymer electrolyte membranes without solvent or plasticizer can give high conductivity at room temperature ($>10^{-6}$ S/cm). Polymer electrolyte gel membranes of the present invention can provide high room temperature conductivity comparable to that of liquid electrolytes ($>10^{-4}$ S/cm). The covalently crosslinked solid electrolyte and gel electrolyte membranes also have excellent mechanical properties and solvent resistance.

The solid polymer electrolyte or gel electrolyte may include electrolyte salts, including the well-known lithium salts, alkali metal salts, etc. For example, salts such as lithium bis trifluoromethanesulfonate, lithium perchlorate, lithium tetrafluoroborate, etc can be used individually or in mixtures. The solid polymer electrolyte may include additional known ion conductive polymers along with the ion conductive polymer of the present invention.

A solid polymer electrolyte constructed as above comprising the present ion conductive polymer can be employed as an electrolyte material in, for example, a battery. The battery may be applied to either a primary battery or a secondary battery, either of which are well known in the art.

Therefore, one embodiment of the present invention provides a room temperature crosslinkable polymer system, and a polymer derived therefrom, that can be used as a solid polymer electrolyte for ion conducting. Another embodiment of the present invention provides a solid polymer electrolyte having good conductivity and high cation transport number at room temperature. Other embodiments include a flexible solid electrolyte film or membrane to give good contact with an electrode, a crosslinkable polymer system that can be used as binder for making positive electrode (cathode) and negative electrode (anode) for lithium ion batteries.

Another embodiment provides a crosslinked polymer in the form of solid gel containing liquid electrolyte that can be used as a gel polymer electrolyte with excellent ion conductivity in, for example, Li ion batteries.

Another embodiment provides a crosslinked polymer matrix in the form of membranes which are non-soluble but swellable in an organic liquid electrolyte for use as a gel polymer electrolyte with stable dimensions and good physical properties.

Another embodiment provides a versatile method to make clear rubbery insoluble membranes containing a high content of oxyalkylene ether. The membranes can be formed at room temperature and room temperature ion conductivity higher than conventional solid polymer electrolyte can be achieved.

While the chemistry of the invention is detailed above for reacting maleic anhydride copolymers with amino polyalkyleneoxides such as JEFFAMINES, other polymers and alkyleneoxy amines can of course be employed. To further optimize properties of the ion conducting polymer, one can also react additional compounds, for example, alcohols or amines, i.e., mono-amines or polyamines such as ethylenediamine or diethylenetriamine, with the polyanhydride, either in the same step as the amino alkyleneoxides or an additional step.

Various metal salts and metal containing bases can be used in the reactions and incorporated into the resulting polymers. Li salts however offer advantages in solid polymer electrolyte membranes as related in other portions of the specification. Inorganic or organic metal salts can be used, but organic metal salts offer advantages in solubility of solvents commonly employed in the above processes.

The reaction of an anhydride containing polymer and oxyalkyleneamine can be carried out in solvent without or with an electrolyte or lithium salt. Examples of suitable solvents for dissolving polyanhydrides and oxyalkyleneamine include, but are not limited to, ethers such as tetrahydrofuran (THF); ketones such as acetone and methyl ethyl ketone; nitriles such as acetonitrile, propionitrile and valeronitrile; N-alkylamides such as N-methylpyrrolidinone; N-alkylimide such as N-methyl succinimide; carbonates such as ethylene carbonate, propylene carbonate and dimethyl carbonate; and mixtures of the solvents. Examples of lithium salts include lithium perchlorate, lithium trifluoromethane sulfonate, lithium hexafluorophosphate, lithium hexafluoroarsenate, lithium tetrafluoroborate, lithium bromide, lithium trifluoromethanesulfonimide, lithium iodide and mixtures of the lithium salts.

Ion conductive polymer electrolyte membranes or films in many cases can be conveniently prepared by solution casting, spin coating or any suitable coating method directly from the reaction solution. The obtained membranes can be further treated with heat at elevated temperature from 60 to 250° C., preferably, 100 to 180° C. to convert to succinimide containing polymers.

Soluble oxyalkyleneamides and polyoxyalkyleneimides can be prepared in solution or solid product forms using a mono-functional oxyalkyleneamine. Ion conductive polymer electrolyte membranes and films can then be prepared by dissolving the polymer in a liquid electrolyte and solution casting or coating the solution onto the substrate.

For instance, the polymer obtainable (e.g. obtained) by reaction of the maleic anhydride polymer with the at least one amine is treated with heat at elevated temperature from about 60° to about 250° C., such as from 60° C. to 250° C.

For example, the solid polymer electrolyte or gel electrolyte comprises an ion conductive polymer as defined herein.

For instance, the solid polymer electrolyte or gel electrolyte comprises a metal carboxylic acid salt connected to the polymer backbone or complexed electrolyte salt.

For example, the solid polymer electrolyte or gel electrolyte comprises a lithium carboxylic acid salt connected to the polymer backbone or complexed electrolyte lithium salt.

An object of the invention is a battery having a cathode, an anode and a solid polymer electrolyte or gel electrolyte as defined herein.

Another object of the invention is a molded membrane comprising a polymer as defined herein.

A further object of the invention is the use of a polymer as defined herein in a solid polymer electrolyte or gel electrolyte or a molded membrane.

The following examples illustrate certain embodiments of the invention but the invention is not limited thereto.

EXAMPLES

Raw Materials

The following materials are used to prepared crosslinked polymers and electrolytes of the invention.

Table 1 lists three commercially available maleic anhydride/styrene copolymers (PSMAn) with different molecular weight (MW), methyl ester content, Tg and ratio of styrene to maleic anhydride (St:MAN ratio).

TABLE 1

Poly(styrene-co-maleic anhydride)

| PSMAn | MW, g/mole | Methyl ester content | Tg, °C. | St:MAn ratio |
|---|---|---|---|---|
| A7 | Mn = 1,600 | 0 | 160 | 1:1 |
| A7' | Mw = 350,000 | 10-15% | 243 | 1:0.88 |
| A7" | Mw = 50,000 | 0 | 160 | 1:1 |

Table 2 lists three commercially available JEFFAMINE polyoxyalkyleneamines with similar molecular weight (2000) but different functionality. JEFFAMINE XTJ502 (C11) and D2000 (C12) are di-functional amine crosslinkers containing mainly polyoxyethylene (PEO) and polyoxypropylene (PPO) segments respectively; XTJ507 (C13) is a mono-functional amine PEO.

TABLE 2

JEFFAMINE Polyoxyalkleneamines

| ID | | $n_f$* | Mw | Total amine meq/g | Mp °C. |
|---|---|---|---|---|---|
| C11 | XTJ502 | 2 | 2000 | 0.93 | 43 |
| C12 | D2000 | 2 | 2000 | 0.97 | <20 |
| C13 | XTJ507 | 1 | 2000 | 0.47 | −36 |

*$n_f$ = amine functionality
C11 corresponds to

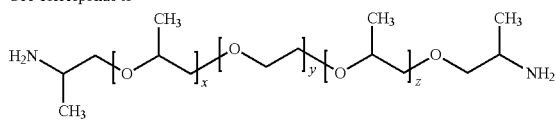

Where y is ~39 and x + z = 6.
C12 corresponds to

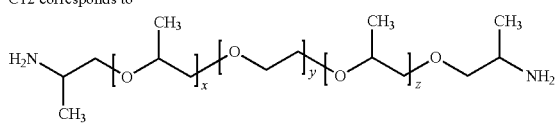

Where y and z are both 0 and x is ~32.
C13 corresponds to

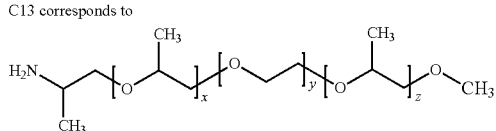

Where y is ~6 and x + z = 29.

Tetrahydrofuran (THF) solutions of the copolymers and polyoxyalkyleneamines are readily available by simply dissolving the desired amount of copolymer or polyoxyalkyleneamines in an appropriate amount of THF.

Table 3 lists commercially available lithium salts used to prepare polymer electrolytes with the PEO/PPO containing polymer.

TABLE 3

Lithium Salts

| | | Formula | FW, g/mole | Purities |
|---|---|---|---|---|
| A | Lithium perchloride | LiClO$_4$ | 106.39 | >99% |
| B | Lithium trifluoromethane-sulfonate | CF$_3$SO$_3$Li | 156.01 | 99.995% |
| C | Lithium hexafluoro-phosphate | LiPF$_6$ | 151.9 | 99.99% |
| D | Lithium hexafluoroarsenate | LiAsF$_6$ | 195.85 | 98% |
| E | Lithium tetrafluoroborate | LiBF$_4$ | 93.74 | 98% |
| F | Lithium bromide | LiBr | 86.85 | 99.000% |
| G | LiTFSI, Lithium bis(tri-fluoromethane-sulfonyl)imide, | LiN(CF$_3$SO$_2$)$_2$ | 287.08 | 99.95% |

Conductivity Measurement

For conductivity measurements solid polymer electrolyte membranes or gel polymer electrolyte membranes are sandwiched between two symmetrical electrodes of the same metal (brass or stainless steel). The electric conductivity is determined by AC impedance measurement using a SOLARTRON 1252A frequency response analyzer (FRA) in combination with a SOLARTRON 1287A electrochemical interface (ECI). Complex impedance spectra is obtained with a frequency range from 0.1 to 300 kHz with an AC voltage amplitude of 20 mV. Bulk resistance is obtained from a semi-circular arc of the complex impedance spectra to calculate the ion conductivity of the analyzed polymer electrolyte film with known area and thickness.

Example 1

Solid membranes comprising the crosslinked polymers of the invention are prepared by mixing 2.9 grams of a 12% by weight solution of PSMAn copolymer A7 in tetrahydrofuran (THF) and 7.5 grams of a 40% by weight solution of polyethyleneoxide diamine C11 in THF to form a clear reaction solution of low viscosity and about three minutes after preparation of the reaction solution casting approximately 1.5 grams of the reaction solution into each of two glass Petri dishes and an aluminum weighing dish. The cast solutions are allowed to cure and evaporate out solvent at room temperature. After about 15 minutes the cast films were dry to touch and insoluble in THF. Cure, as determined by no further change in appearance, mechanical properties and solvent swelling, is considered complete after standing overnight at room temperature producing clear, rubbery, dry films which are peeled off the casting dishes to yield solid membranes.

The remaining reaction solution which is not cast increases in viscosity and starts to gel in about 150 minutes (pot life) at room temperature. A clear solid gel containing crosslinked polyoxyethyleneamide and THF solvent is obtained over night.

The crosslinked polyoxyethyleneamide in the solid membranes and the gel obtained in this example contain about 90% by weight of ethylene oxide (EO)/propylene oxide (PO) units available for ion complexing and conducting.

It is noted that neither of the starting materials, A7 or C11, are film forming polymers as no coherent film of either is obtained by solution casting from THF.

Example 2

Following a procedure analogous to Example 1, solid membranes comprising crosslinked polymers of differing compositions are prepared by mixing different amounts of a 20% weight solution of PSMAn copolymer A7 in THF and a 40% by weight solution of polyethyleneoxide diamine C11 in THF solution as shown in the table to form a clear solution and casting, after about 5 minutes into each of three separate Petri dishes.

The cured dry films are obtained after standing overnight at room temperature and their properties are summarized in Table Ex2 along with their compositions.

Solubility of the polymers is tested by putting a small piece of cured film in different testing solvent: H2O, THF, acetonitrile (CH3CN), chloroform, methanol (MeOH), and isopropanol IPA. Formation of maleicamic acid by reaction of anhydride with primary amine is confirmed by FTIR spectra of the water extracted membrane and non-extracted membrane.

TABLE Ex2

|  | Example | | | | |
|---|---|---|---|---|---|
|  | 2A | 2B | 2C | 2D | 2E |
| 20% Solution of A7, grams | 8.40 | 6.00 | 4.60 | 14.50 | 25.0 |
| 40% Solution of C11, grams | 20.8 | 22.00 | 22.7 | 17.75 | 12.5 |
| C11/A7, w/w | 83/17 | 88/12 | 91/9 | 71/29 | 50/50 |
| Amine/anhydride ratio, mol/mol | 1.0 | 1.5 | 2.0 | 0.5 | 0.2 |
| Cured film properties* | 1f | 1f | 2f | 3f | 3f |

*1f free standing membranes, transparent and rubbery, insoluble in test solvents: H2O, THF, MeOH, CH2Cl2, CH3CN, and IPA;
2f same as 1f but softer and stickier;
3f films form but are difficult to obtain free standing membranes, very soft and sticky Example 3

Following the same procedure as in Example 2, membranes of crosslinked EO/PO containing copolymers are prepared by mixing solutions of different PSMAn copolymers with solutions of different polyoxyalkyleneamines as shown in Table Ex 3 to produce a mixture containing a 1:1 ratio of amine to anhydride ratio in a solution containing approximately 20% solids. Thin free-standing films (membranes) with predetermined thickness are obtained by casting the appropriate amount of this reaction solution in Teflon Petri dishes of 28 cm$^2$ area.

Crosslinked polymer electrolyte membranes with fixed anionic carboxylate groups and movable Li$^+$ ions are obtained in Examples 3F, 3G and 3H by including appropriate amount of lithium methoxide (LiOMe) to achieve desired degree of neutralization (DN) of the amic acid.

Crosslinked polymer electrolyte membranes of polyethyleneoxide imide are obtained from Example 3C by heating the membrane of Example 3B at 140° C. in a vacuum oven and from Example 3H by heating the membrane of Example F at 140° C. in a vacuum oven. The membranes after the heat treatment turn color to brown or yellow and appear to have improved mechanic properties.

All crosslinked membranes obtained in theses examples are insoluble with most organic liquid electrolytes. Swelling index (SI) with LP30 (1 M LiPF$_6$ in 1:1 ethylene carbonate and dimethyl carbonate) is about 4 (gel electrolyte containing 20% polymer).

This example also demonstrates that solid polymer electrolyte membranes with required thickness can be prepared by controlling polymer concentration of the casting solution and area of cast container.

TABLE Ex3

Polymer electrolyte membranes of different composition and thickness

| | Composition | Solvent | Appearance | Thickness, mm |
|---|---|---|---|---|
| Ex 3A | A7"/C11 | CH$_3$CN | Cloudy, non-sticky | 0.03-0.07 |
| Ex 3B | A7/C11/ | MEK | Cloudy, non-sticky | 0.04-0.10 |
| Ex 3C | A7/C11/heat* | MEK | Cloudy, non-sticky, brown | 0.05-0.06 |
| Ex 3D | A7/C12 | THF | Cloudy, non-sticky | 0.05-0.07 |
| Ex 3E | A7"/C12 | THF | Transparent, sticky | 0.06-0.12 |
| Ex 3F | A7"/C11 DN-100% | THF | Transparent, non-sticky | 0.04-0.12 |

TABLE Ex3-continued

Polymer electrolyte membranes of different composition and thickness

| | Composition | Solvent | Appearance | Thickness, mm |
|---|---|---|---|---|
| Ex 3G | A7/C11 DN-36% | MEK | Transparent, sticky | 0.05-0.30 |
| Ex 3H | A7"/C11/heat* DN-100% | THF | Transparent, non-sticky, yellow | 0.05-0.07 |

*Heat = vacuum heated at 140° C. for converting to imide;

Example 4

Following a procedure analogous to Example 1, solid membranes of non-crosslinked polymers are prepared by reacting solutions of PSMAn A7 and A7' with a mono-functional EO/PO amine C13 as shown in Table Ex 4. Example 4A provides membranes with 50 wt % of EO/PO ether content with an amine/anhydride ratio of 0.1 from a low MW (1600) PSMAn (A7). Example 4B provides membranes with a high EO/PO content 83 wt % and a high amine/anhydride ratio (0.5) from a high MW (350,000) partially methyl esterified PSMAn (A7').

Membranes prepared with monofunctional EO/PO amine C13 are transparent but have much poorer mechanical properties than those crosslinked with diamine EO/PO C11 and C12, and require more time for form coherent films with a gel time of about 45 hours even at relatively high polymer concentration. Films with better mechanical properties and solvent resistance are obtained from the high MW (350,000) partially methyl esterified PSMAn (A7') than from PSMAn (A7.

TABLE Ex 4

Reactions w/ mono-functional amino EO/PO (C13)

| | Example 4A | Example 4B |
|---|---|---|
| PSMAn | A7 | A7' |
| C13, wt % | 50 | 83 |
| Amine/Anhydride ratio | 0.1 | 0.5 |

Example 5

Following a procedure analogous to Example 1, solid membranes of crosslinked polymers are prepared from solutions of a high MW (50,000) PSMAn A7" with PO diamine C12 (PPODA) as shown in Table Ex 5. Membranes with improved mechanical properties (stronger and less tacky) were obtained.

TABLE Ex 5

Membranes from C12 (PPODA) and A7" (PSMAn, Mw 50,000)

| | Wt % PPODA | Am/An ratio | Gel time* min | Film Properties |
|---|---|---|---|---|
| Ex 5A | 83 | 1.0 | 20 | Transparent, rubbery |
| Ex 5B | 88 | 1.5 | 110 | Transparent, rubbery |
| Ex 5C | 91 | 2.0 | n/d | Transparent, rubbery, sticky |
| Ex 5D | 71 | 0.5 | 160 | slight hazy transparent, rubbery, |
| Ex 5E | 50 | 0.2 | 210 | slight hazy transparent, rubbery but harder |

*at 8% solid concentration;
n/d = not determined

Example 6A

Following a procedure similar to Example 1, crosslinked polymer electrolyte membranes containing Li salt are prepared by mixing 8.4 grams of a 20 wt % solution of PSMAn A7 in tetrahydrofuran (THF), 20.8 grams of a 40 wt % solution of polyethyleneoxide diamine C11 in THF, and 0.5 g of lithium perchlorate ($LiClO_4$) (pre-dissolved in THF to give a 10% solution) to form a clear reaction solution and about two minutes after preparation of the reaction solution casting portions of the reaction solution into glass Petri dishes.

Reaction solution remaining in the reaction vessel gels in less than 8 hour at room temperature indicating crosslinking reaction of the polymers can proceed in presence of the Li salt. The cast solutions in Petri dishes are allowed to cure and evaporate out solvent at room temperature for seven days to provide transparent and rubbery insoluble membranes of solid polymer electrolyte containing 5 wt % of $LiClO_4$.

Examples 6B and 6C

Following the procedure of Example 6A using different Li salts and concentrations, polymer electrolyte membranes containing 10 wt % of lithium trifluoromethanesulfonate ($CF_3SO_3Li$) (based on total polymer weight) Example 6B, and polymer electrolyte membranes containing 10 wt % of lithium bromide (LiBr) Example 6C, are prepared.

Room temperature (20° C.) ionic conductivity is measured for the membranes and the results shown in the Table Ex6.

TABLE Ex6

Polymer electrolyte membranes C11/A7 of 17/83 w/w

|  | Li Salt content | Conductivity (20° C.), S/cm |
|---|---|---|
| Ex 6A | $LiClO_4$, 5% | $7.43 \times 10^{-6}$ |
| Ex 6B | $CF_3SO_3Li$, 10% | $1.09 \times 10^{-5}$ |
| Ex 6C | LiBr, 10% | $1.06 \times 10^{-5}$ |

Example 7A

Following a procedure similar to Example 6, crosslinked polymer electrolyte membranes containing Li salts are prepared from solutions in methylethylketone (MEK) by dissolving 0.5 g of $LiClO_4$ in MEK and then adding with mixing 10.4 grams of a 40% by weight solution of polyethyleneoxide diamine C11 in MEK followed by addition of 4.2 grams of a 20% by weight solution of PSMAn copolymer A7 in MEK. After 5 minutes of mixing portions of the reaction solution are cast into glass Petri dishes and dried overnight under vacuum to provide Solid polymer electrolyte membranes containing no solvent.

Example 7B

Following the procedure of Example 7A, solid polymer electrolyte membranes containing 10% $LiBF_4$ salt are prepared substituting the appropriate amount of $LiBF_4$ as the Li salt.

Example 7C

The procedure of Example 7B is repeated except that 0.45 grams of a 10% lithium methoxide ($LiOCH_3$) solution in methanol is added to the MEK solution of $LiBF_4$ to provide solid polymer electrolyte membranes with multiple lithium salts.

Room temperature (20° C.) ionic conductivity is measured for the membranes and the results shown in the Table Ex 7.

TABLE Ex7

Polymer electrolyte membranes C11/A7 of 17/83 w/w

|  | Li Salts | Conductivity (20° C.), S/cm |
|---|---|---|
| Ex 7A | $LiClO_4$, 10% | $4.47 \times 10^{-6}$ |
| Ex 7B | $LiBF_4$, 10% | $2.71 \times 10^{-6}$ |
| Ex 7C | LiBF, 10%, $LiOCH_3$, 0.9% | $8.69 \times 10^{-6}$ |

Example 8A

A polymer electrolyte gel of crosslinked polymer is prepared by dissolving 0.83 g of $LiClO_4$ in MEK in a beaker and then adding with mixing 10.4 grams of a 40% by weight solution of polyethyleneoxide diamine C11 in MEK followed by addition of 4.2 grams of a 20% by weight solution of PSMAn copolymer A7 in MEK. The reaction solution is not cast but allowed to gel in the beaker to provide after about 3 hours a semi-solid elastic gel containing about 30% polymer and about 5% $LiClO_4$ (16.6% based on polymer weight).

Example 8B

The procedure of Example 8A is repeated except that 1.5 g instead of 0.83 g of $LiClO_4$ is used to provide a solution that gels in about 65 hours to give a semi-solid elastic gel containing about 20% polymer and about 6% $LiClO_4$ (30% based on polymer weight).

Room temperature (20° C.) ionic conductivity is measured for the membranes and the results shown in Table Ex 8.

TABLE Ex 8

Polymer electrolyte membranes C11/A7 of 17/83 w/w

|  | Li Salts | Conductivity (20° C.), S/cm |
|---|---|---|
| Ex 8A | $LiClO_4$, 17% | $4.37 \times 10^{-3}$ |
| Ex 8B | $LiClO_4$, 30% | $1.66 \times 10^{-2}$ |

Comparative Examples

For comparison to the inventive membranes, solid polymer electrolyte membranes of poly(ethylene oxide) (PEO) containing various amounts of lithium salts are prepared by adding to 37.4 grams of a 6.7 wt % solution of a PEO polymer (MW ~900,000 g/mole) in acetonitrile either 0.25 g of $LiClO_4$ pre-dissolved in acetonitrile, 0.5 g of $LiClO_4$ pre-dissolved in acetonitrile or 0.37 g of $CF_3SO_3Li$ pre-dissolved in acetonitrile. The resulting solutions are cast into Petri dishes as above and allowed to stand overnight at room temperature to provide turbid white membranes containing 10% $LiClO_4$ based on PEO weight, 20% $LiClO_4$ based on PEO weight and 15% $CF_3SO_3Li$ based on PEO weight respectively.

Room temperature (20° C.) ionic conductivity is measured for the membranes and the results shown in Table C Ex 1.

TABLE C EX 1

|  | Li Salts, % on PEO | Conductivity (20° C.), S/cm |
|---|---|---|
| 1A | $LiClO_4$, 10% | $3.87 \times 10^{-8}$ |
| 1B | $LiClO_4$, 20% | $4.65 \times 10^{-7}$ |
| 1C | $CF_3SO_3Li$, 15% | $7.00 \times 10^{-8}$ |

The solid polymer electrolyte of the present invention as shown in Examples 6-8 provide room temperature conductivity above $10^{-6}$ S/cm, more than 10 times higher than that of conventional solid PEO polymer electrolyte.

The invention claimed is:

1. A solid polymer electrolyte or gel electrolyte polymer comprising an ion conductive polymer grafted or crosslinked comprising in the backbone of the polymer one or more moieties selected from Formula I

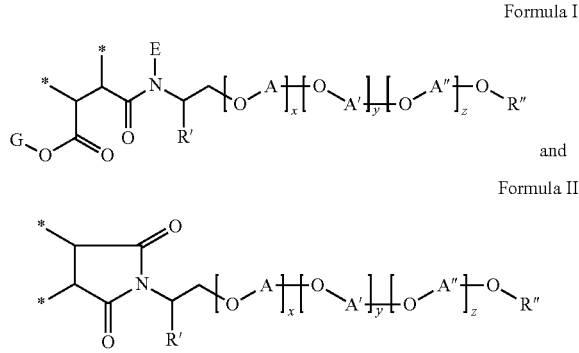

and

Formula II wherein
- \* designates connection to the rest of polymer backbone which is anhydride copolymer,
- G is H, $C_{1-12}$ alkyl, metal cation or amino cation,
- A, A' and A" are independently of the others $C_{1-24}$ alkylene,
- each of x, y and z is a number from 0 to about 125, and at least one of x, y or z is 1 or higher,
- E is H, $C_{1-12}$ alkyl, or $C_{1-12}$ alkyl carbonyl,
- R' is H or $C_{1-12}$ alkyl,
- R" is H, $C_{1-12}$ alkyl, $C_{1-12}$ alkyl carbonyl, $C_{6-10}$ aryl, $C_{6-10}$ aryl substituted by 1 or more $C_{1-12}$ alkyl, $C_{7-12}$ aralkyl, $C_{7-12}$ aralkyl substituted by 1 or more $C_{1-12}$ alkyl, or a group

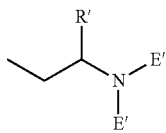

wherein each E' is independently H, $C_{1-12}$ alkyl, or $C_{1-12}$ alkyl carbonyl,
or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more moieties of Formula I or Formula II,
or the two E' groups together form a maleimide group which is fused to the same polymer backbone or to the backbone of another polymer chain which comprises in the backbone of the polymer chain one or more moieties of Formula I or Formula II and thus forming a crosslink,
wherein—formula I and II are obtainable by reacting a maleic anhydride copolymer with at least one amine of the formula

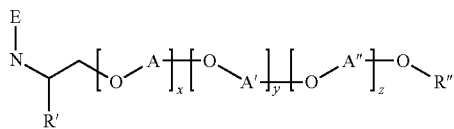

and the maleic anhydride copolymer is a maleic anhydride copolymer with styrene.

2. The solid polymer electrolyte or gel electrolyte according to claim 1 comprising in the backbone of the polymer one or more moieties selected from

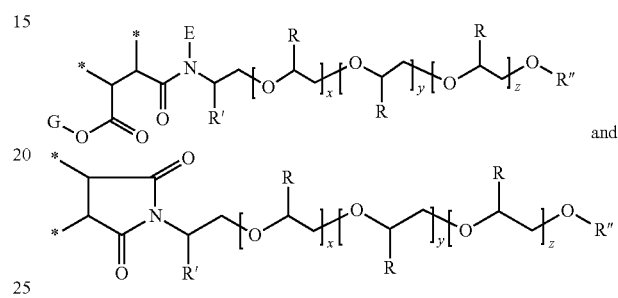

wherein
each R independently of the others is H or $C_{1-12}$ alkyl.

3. The solid polymer electrolyte or gel electrolyte according to claim 2 wherein
- G is H, $C_{1-12}$ alkyl or a metal cation selected from Li, Na, K, Mg and Ca,
- E is H,
- each R independently of the others is H or $C_{1-12}$ alkyl,
- R' is H or methyl
- and R" is H or a group

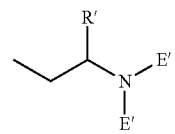

wherein each E' is H or one E' is H, and the other is a carbonyl linking group which forms a crosslink to same polymer backbone or to the backbone of another polymer chain which comprises in the backbone of the polymer chain one or more moieties of Formula I or Formula II, or the two E' groups together form a maleimide group which is fused to the same polymer backbone or to the backbone of another polymer chain which comprises in the backbone of the polymer chain one or more moieties of Formula I or Formula II and thus forming a crosslink.

4. The solid polymer electrolyte or gel electrolyte according to claim 2 comprising in the backbone of the polymer one or more moieties selected from

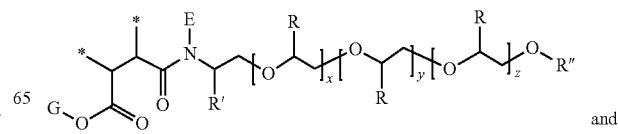

and

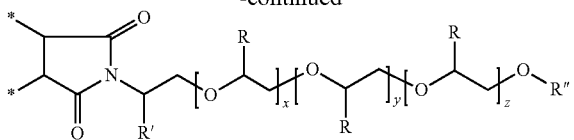

Wherein
G is H, $C_{1-12}$ alkyl or a metal cation,
E is H, $C_{1-12}$ alkyl, or $C_{1-12}$ alkylcarbonyl,
R' and each R independently are H or $C_{1-12}$ alkyl,
R" is H, $C_{1-12}$ alkyl, or $C_{1-12}$ alkylcarbonyl or a group

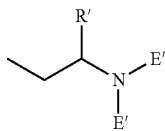

wherein each E' is independently H, $C_{1-12}$ alkyl, or $C_{1-12}$ alkyl carbonyl,
or one E' is H, $C_{1-12}$ alkyl, or $C_{1-12}$ alkyl carbonyl and the other is a carbonyl linking group which forms a crosslink to same polymer backbone or to the backbone of another polymer chain which comprises in the backbone of the polymer chain one or more moieties of Formula I or Formula II,
or the two E' groups together form a maleimide group which is fused to the same polymer backbone or to the backbone of another polymer chain which comprises in the backbone of the polymer chain one or more moieties of Formula I or Formula II and thus forming a crosslink.

5. The solid polymer electrolyte or gel electrolyte polymer according to claim 2, wherein the polymer contains in the backbone crosslinked moieties selected from

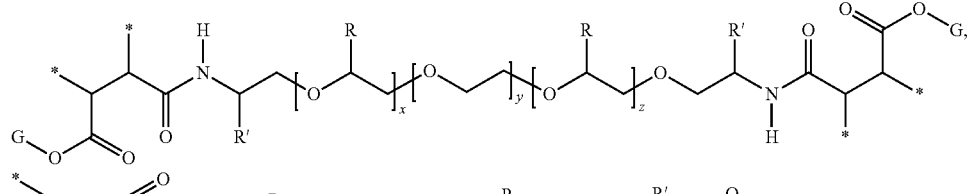

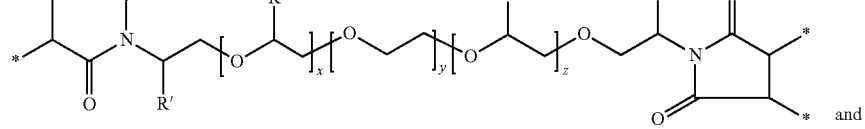

and

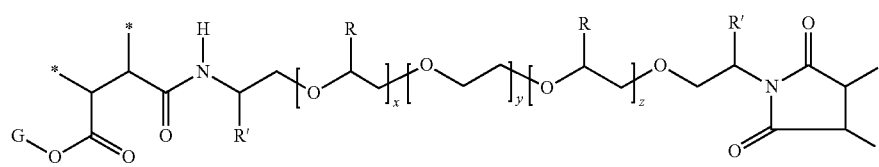

wherein
G is H, $C_{1-12}$ alkyl, metal cation or amino cation,
R' and each R independently are H or $C_{1-12}$ alkyl.

6. The solid polymer electrolyte or gel electrolyte polymer according to claim 1 which is obtainable by reacting the maleic anhydride copolymer with at least one amine of the formula

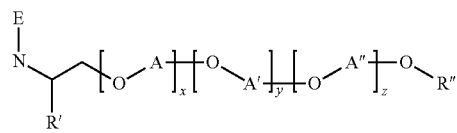

wherein
A, A' and A" are independently of the others $C_{1-24}$ alkylene,
each of x, y and z is a number from 0 to about 125, and at least one of x, y or z is 1 or higher,
E is H, $C_{1-12}$ alkyl, or $C_{1-12}$ alkyl carbonyl,
R' is H or $C_{1-12}$ alkyl,
R" is H, $C_{1-12}$ alkyl, $C_{1-12}$ alkyl carbonyl, $C_{6-10}$ aryl, $C_{6-10}$ aryl substituted by 1 or more $C_{1-12}$ alkyl, $C_{7-12}$ aralkyl, $C_{7-12}$ aralkyl substituted by 1 or more $C_{1-12}$ alkyl, or a group

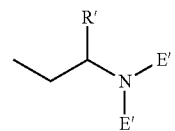

wherein each E' is independently H, $C_{1-12}$ alkyl or $C_{1-12}$ alkylcarbonyl.

7. The solid polymer electrolyte or gel electrolyte polymer according to claim 6 which is obtainable by reacting a maleic anhydride copolymer with at least one amine of the formula

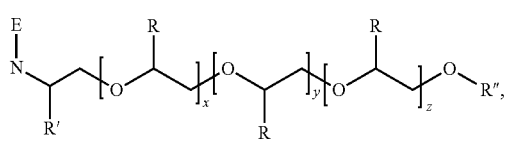

wherein each R independently of the others is H or $C_{1-12}$ alkyl.

8. The solid polymer electrolyte or gel electrolyte polymer according to claim 6 which is obtainable by reacting a maleic anhydride copolymer with at least one amine of the formula

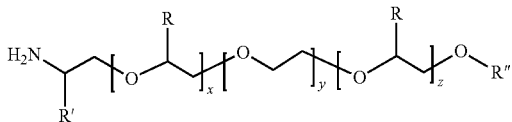

wherein
R is methyl,
R' is H or methyl,
R" is H, $C_{1-12}$ alkyl, $C_{1-12}$ alkylcarbonyl, phenyl, phenyl substituted by 1 or more $C_{1-12}$ alkyl, benzyl, phenethyl, benzyl or phenethyl substituted by 1 or more $C_{1-12}$ alkyl, or a group

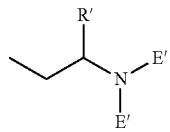

wherein each E' is independently H, $C_{1-12}$ alkyl, or $C_{1-12}$ alkylcarbonyl; wherein 1-99% of the anhydride units are reacted with amine.

9. The solid polymer electrolyte or gel electrolyte polymer according to claim 1, wherein the maleic anhydride copolymer is poly(styrene-alt-maleic anhydride).

10. The solid polymer electrolyte or gel electrolyte according to claim 1, comprising a metal carboxylic acid salt connected to the polymer backbone or an electrolyte salt complexed to the polymer backbone.

11. The solid polymer electrolyte or gel electrolyte according to claim 1, wherein the electrolyte salt is a lithium salt.

12. A battery having a cathode, an anode and a solid polymer electrolyte or gel electrolyte according to claim 1.

13. A molded membrane comprising a polymer according to claim 1.

14. A process for preparing the solid polymer electrolyte or gel electrolyte polymer comprising an ion conductive polymer grafted or crosslinked a polymer according to claim 1 wherein a maleic anhydride copolymer is reacted with at least one amine of the formula

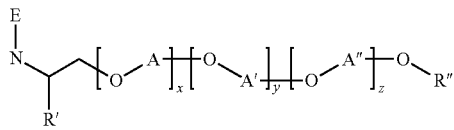

wherein
A, A' and A" are independently of the others $C_{1-24}$ alkylene,
each of x, y and z is a number from 1 to about 125,
E is H, $C_{1-12}$ alkyl, or $C_{1-12}$ alkyl carbonyl,
R' is H or $C_{1-12}$ alkyl,
R" is H, $C_{1-12}$ alkyl, $C_{1-12}$ alkyl carbonyl, $C_{6-10}$ aryl, $C_{6-10}$ aryl substituted by 1 or more $C_{1-12}$ alkyl, $C_{7-12}$ aralkyl, $C_{7-12}$ aralkyl substituted by 1 or more $C_{1-12}$ alkyl, or a group

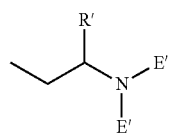

wherein each E' is independently H, $C_{1-12}$ alkyl or $C_{1-12}$ alkylcarbonyl.

15. The process according to claim 14, wherein the polymer obtained by reaction of the maleic anhydride copolymer with the at least one amine is treated with heat at elevated temperature from about 60 to about 250° C.

* * * * *